(12) United States Patent
Livingston et al.

(10) Patent No.: US 9,256,919 B2
(45) Date of Patent: Feb. 9, 2016

(54) SYSTEMS AND METHODS FOR IMAGE PROCESSING USING A RESIZING TEMPLATE

(71) Applicant: Grit Design, Inc., Detroit, MI (US)

(72) Inventors: Eric Livingston, Monroe, MI (US); Carrie Thorpe, Dearborn, MI (US); Mark Stewart, Windsor (CA)

(73) Assignee: GRIT DESIGN, INC., Detroit, MI (US)

( * ) Notice: Subject to any disclaimer, the term of this patent is extended or adjusted under 35 U.S.C. 154(b) by 46 days.

(21) Appl. No.: 14/242,202

(22) Filed: Apr. 1, 2014

(65) Prior Publication Data

US 2014/0301663 A1    Oct. 9, 2014

Related U.S. Application Data

(60) Provisional application No. 61/808,671, filed on Apr. 5, 2013.

(51) Int. Cl.
*G06K 9/32* (2006.01)
*G06T 3/40* (2006.01)

(52) U.S. Cl.
CPC ............ *G06T 3/40* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 6,545,687 B2 | 4/2003 | Scott et al. | |
| 6,721,802 B1 | 4/2004 | Wright et al. | |
| 7,073,131 B2 | 7/2006 | Simpson et al. | |
| 7,209,149 B2 | 4/2007 | Jogo | |
| 7,395,229 B2 | 7/2008 | Haeberli | |
| 7,733,405 B2 | 6/2010 | Van Dyke et al. | |
| 7,990,564 B2 * | 8/2011 | Hanechak | 358/1.18 |
| 8,001,218 B2 | 8/2011 | Wood et al. | |
| 8,031,972 B2 | 10/2011 | Bhakta et al. | |
| 8,081,842 B2 | 12/2011 | Lu et al. | |
| 8,392,532 B2 | 3/2013 | Wood et al. | |
| 2001/0035875 A1* | 11/2001 | Suzuki et al. | 345/723 |
| 2011/0074824 A1 | 3/2011 | Srinivasan et al. | |
| 2011/0170801 A1 | 7/2011 | Lu et al. | |
| 2011/0182502 A1 | 7/2011 | Liang et al. | |
| 2012/0269390 A1 | 10/2012 | Osa | |

OTHER PUBLICATIONS

Laucet, Yaara, "Need Multiple Sizes & Crops of your Images? Get Them in Seconds with SizzlePig," website located at http://www.makeuseof.com/tag/need-multiple-sizes-crops-of-your-images-get-them-in-seconds-with-sizzlepig/, Mar. 5, 2013.

Sandler, Kyle, "Even Startup Chicks Love Bacon, Grit Design Introduces SizzlePig," website located at http://nibletz.com/2013/02/26/startup-chicks-love-bacon-grit-design-introduces-sizzlepig/, Feb. 26, 2013.

(Continued)

*Primary Examiner* — Eueng-Nan Yeh
(74) *Attorney, Agent, or Firm* — Thomas | Horstemeyer, LLP

(57) ABSTRACT

Disclosed are various embodiments for systems and methods for image processing. A resizing template may be generated having one or more image sizes of an original image based at least in part on resize settings. A preview may then be generated of preview images of the original image based at least in part on the resizing template and the resize settings. The resize settings may be further adjusted via the preview. Upon approval of the preview and the adjusted resize settings, the original image is processed to generate final resized images according to the template and the modified resize settings.

19 Claims, 9 Drawing Sheets

(56) References Cited

OTHER PUBLICATIONS

Esengulov, Aibek, "Cool WEbsites and Tools," website located at http://www.makeuseof.com/tag/cool-websites-and-tools-february-23rd-2013/, Feb. 23, 2013.

"7 Promising Technology Startups From Everywhereelse.co", website located at http://www.msearchllc.com/blog/7-promising-technology-startups-everywhereelseco, Feb. 15, 2013.

Agarwal, Cherry, "Sizzlepig—Resize multiple images (yes, entire folders) right before your eyes,", website located at http://startcup.in/sizzlepig-resize-multiple-images-yes-entire-folders-right-before-your-eyes/, Jan. 14, 2013.

Kanlapan, Ves, "How to: Bulk Resize, Crop Multiple Images online all at once," website located at http://techtalkshq.com/how-to-bulk-resize-crop-multiple-images-online-all-at-once/#.US48Les4Uc-, Nov. 20, 2012.

Melo, Daniel, "Sizzlepig Lets You Edit and Resize Multiple Images in a Flash," website located at http://www.killerstartups.com/startup-spotlight/sizzlepig-resize-multiple-images/, Nov. 12, 2012.

"Sizzlepig beta now open," website located at https://www.sizzlepig.com/11-01-2012-sizzlepig-beta-now-open, Nov. 1, 2012.

"Sizzlepig: Batch Processing of Images Using Dropbox," website located at http://www.makeuseof.com/tag/sizzlepig-batch-processing-images-dropbox/, Oct. 30, 2012.

Vijayabanu, Manickam, "An Intuitive Cloud Concept for Image Resizing," website located at http://www.mediacrayon.com/sizzlepig, Oct. 29, 2012.

Agarwal, Amit, "Resize Multiple Images Without Any Software", website located at http://www.labnol.org/internet/batch-resize-images/26283/, Oct. 24, 2012.

* cited by examiner

SYSTEMS AND METHODS FOR IMAGE PROCESSING USING A RESIZING TEMPLATE

CROSS REFERENCE TO RELATED APPLICATIONS

This application claims priority to copending U.S. Provisional Patent Application titled "Systems and Methods for Image Processing" filed on Apr. 5, 2013 and assigned application No. 61/808,671, which is incorporated by reference herein in its entirety.

BACKGROUND

Images may be processed and resized to conform to various device and image size requirements. Processing an image can be a difficult and timely task. Rotating, resizing, renaming, cropping, and compressing are all various functions that may be performed when processing an image. While processing a single image is a timely task, the time to process multiple images is exponentially greater as each image needs to be processed individually. One alternative to processing multiple images is batch processing with scripts. However, batch processing with scripts requires implementing a set of commands and scripts for processing the images. Since not all images are the same, the final images generated via batch processing with scripts may not all turn out as desired.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

This disclosure relates to systems and methods for processing images. Specifically, this disclosure relates to systems and methods for resizing an original image into multiple resized images having different sizes and aspect ratios at one time.

According to various embodiments of the present disclosure, a user may choose an image source containing original images 50 and an image destination for storing resized images. In some embodiments, a user may select a preexisting template defining resize settings such as required image sizes, file images, image compressions, image types, cropping settings and/or other information for image processing. The user may adjust the resize settings as desired. In other embodiments, a user may create a new template defining the resize settings. Once the template and corresponding resize settings are determined, a preview may be created to provide the user with a preview of the resized images to be generated from the original images according to the resize settings and template. The user may make further adjustments to the resized images in the preview prior to creating the final resized images. For example, the user may crop certain images, redefine image size, delete a certain image size, add a new image size, change compression settings for a particular image, etc. The resized images may be adjusted individually or as groups designated by the user or by the system. Once the resized images in the preview are approved, the final resized images may be generated and stored in the image destination.

Figure 1:
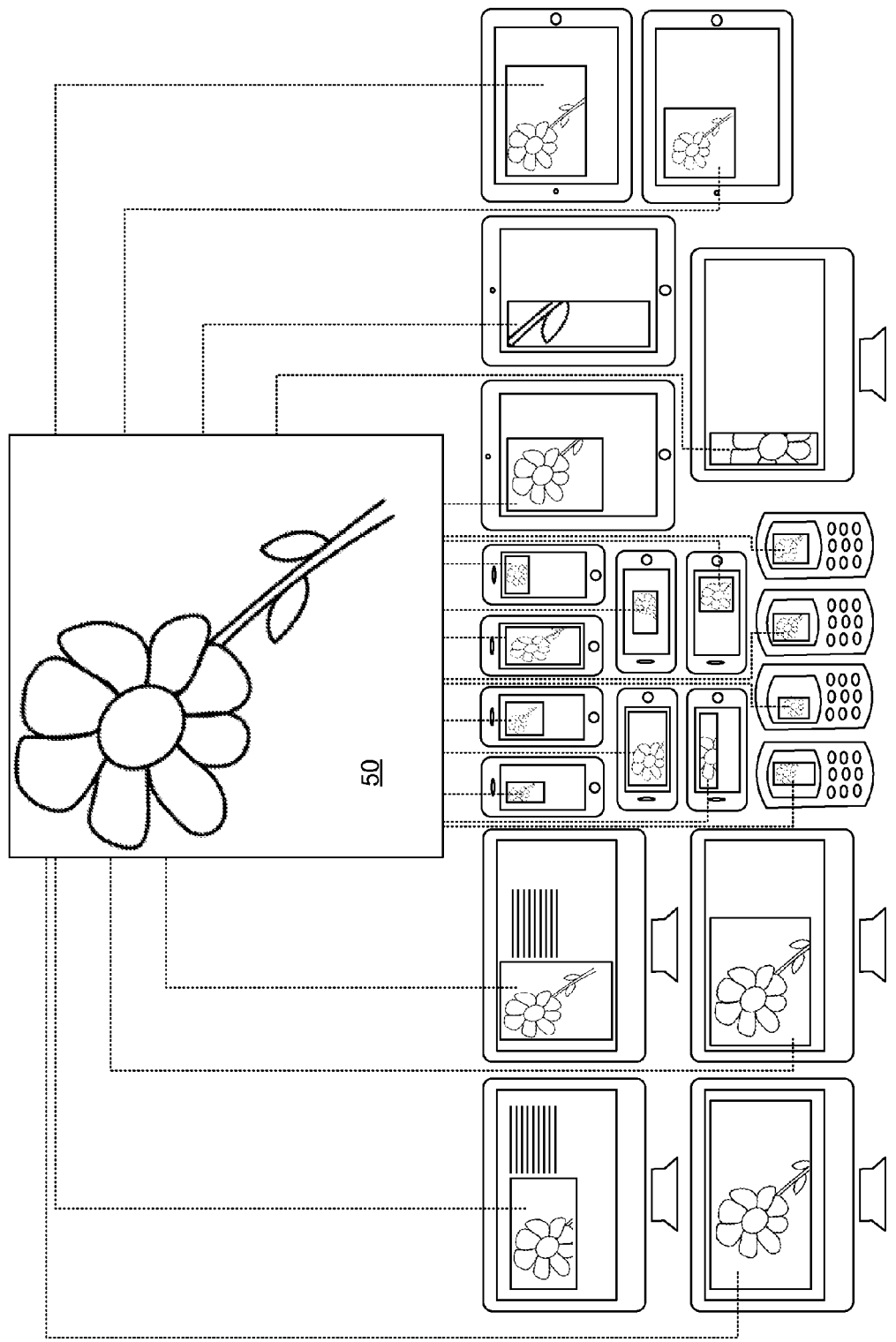
FIG. 1 is an example of a drawing illustrating multiple resized images that have been processed from an original image according to various embodiments of the present disclosure.

FIG. 1 illustrates an original image 50 that has been processed and resized accordingly for multiple devices and/or image size requirements. The images shown in FIG. 1 may be processed accordingly without the use of batch processing with scripts according to the various embodiments disclosed herein. In the following discussion, a general description of the system and its components is provided, followed by a discussion of the operation of the same.

Figure 2A:
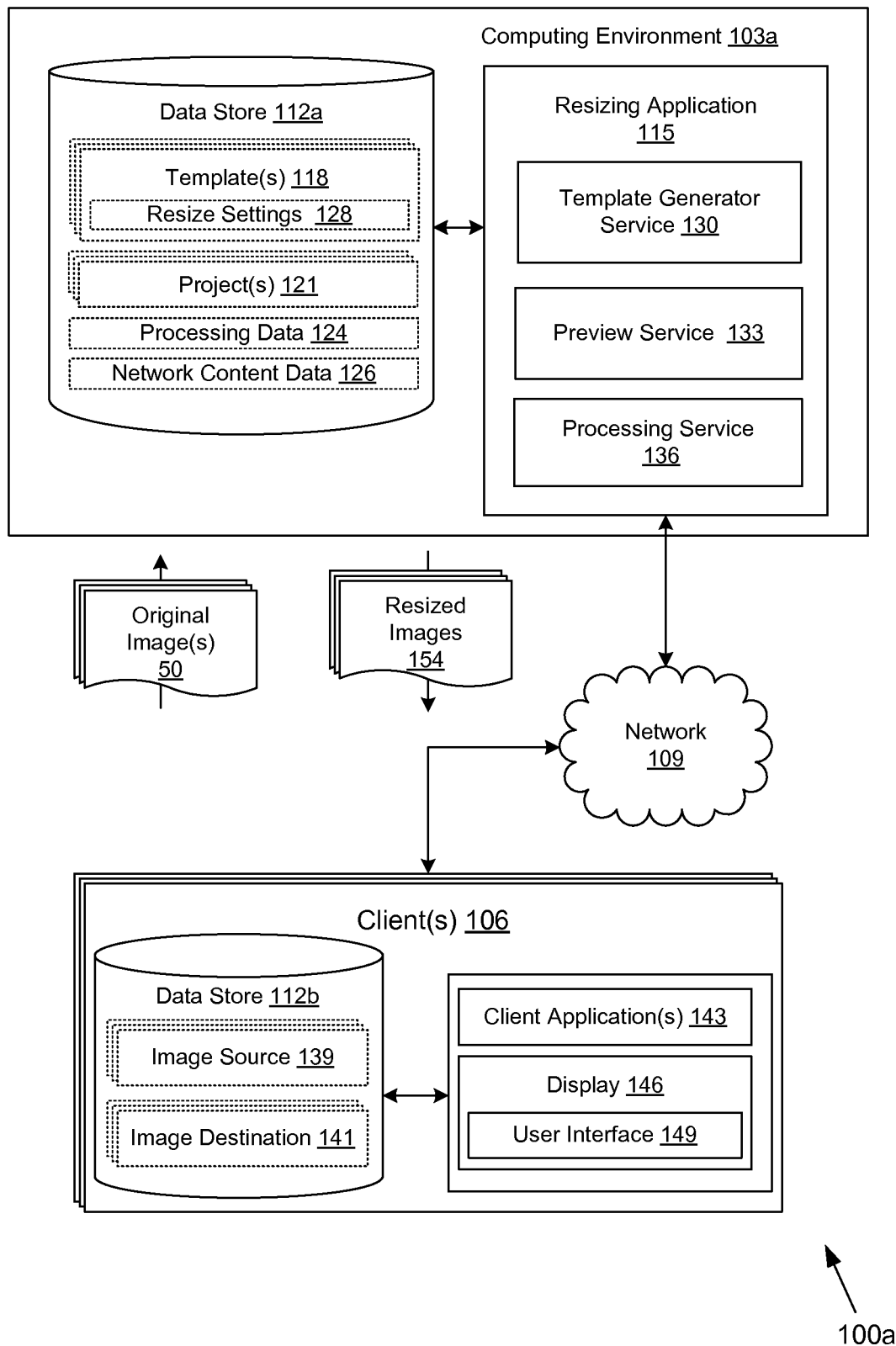
FIGS. 2A-2C are schematic block diagrams of a networked environment according to various embodiments of the present disclosure.

With reference to FIG. 2A, shown is a networked environment 100a according to various embodiments. The networked environment 100a includes a computing environment 103a in data communication with one or more clients 106 via a network 109. The network 109 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 103a may comprise, for example, a server computer or any other system providing computing capability. Alternatively, the computing environment 103a may employ a plurality of computing devices that may be arranged, for example, in one or more server banks, computer banks, or other arrangements. Such computing devices may be located in a single installation or may be distributed among many different geographical locations. For example, the computing environment 103a may include a plurality of computing devices that together may comprise a hosted or "cloud" computing resource, a grid computing resource, and/or any other distributed computing arrangement. In some cases, the computing environment 103a may correspond to an elastic computing resource where the allotted capacity of processing, network, storage, or other computing-related resources may vary over time.

Various applications and/or other functionality may be executed in the computing environment 103a according to various embodiments. Also, various data is stored in a data store 112a that is accessible to the computing environment 103. The data store 112a may be representative of a plurality of data stores 112a as can be appreciated. The data stored in the data store 112a, for example, is associated with the operation of the various applications and/or functional entities described below.

The components executed on the computing environment 103a, for example, include a resizing application 115 and other applications, services, processes, systems, engines, or functionality not discussed in detail herein. The resizing application 115 is executed to facilitate the creation of a project for processing images and to process the images to generate a plurality of final resized images. The resizing application 115 may comprise a template generator service 130, a preview service 133, a processing service 136, and/or other applications that may assist in facilitating and processing the images. The template generator service 130 is executed to define and adjust a template 118 for processing images. The template 118 is used to define various resize settings 128 for resized images for a project. In some embodiments, the template generator service 130 may be executed to create a new template 118 for processing images. In other embodiments, the template generator service 130 may be executed to modify a predefined template 118. The preview service 133 may be executed to generate a user interface comprising a preview of preview images of an original image 50 according to the defined template 118 and respective resize settings 128. The preview service 133 further facilitates the ability to make further adjustments to one or more of the preview images and corresponding resize settings 128 prior to final processing. The processing service 136 is executed to process the original image 50 into final resized images 154 according to resize settings 128 defined via the template generator service 130 and/or the preview service 133. The processing service 136 may further store the final resize images 154 into a destination location.

The data stored in the data store 112a includes, for example, template(s) 118, project(s) 121, processing data 124, network content data 126, and potentially other data. The template(s) 118 may include data defining parameters for resizing images for resizing projects 121. The template(s) 118 may include resize settings 128 corresponding to different templates 118 for resizing projects 121. The resize settings 128 may include information such as, for example, required image sizes, file types, file names, image compressions, image types, watermark data, resolution settings, print-specific settings, unsharp masking settings, filter settings, image grouping settings, preview style settings, preview size settings, cropping settings, scaling settings, padding settings, margin settings, and/or other types of settings appropriate for image processing. The template(s) 118 may comprise multiple templates 118 for various types of projects 121 based at least in part on an original image 50, image source, access point, and/or other appropriate features. The resize settings 128 may correspond to a respective resize image and/or multiple resize images. For example, a template 118 may include four different image sizes 403 (FIG. 4) for an original image 50. Each one of the image sizes 403 may have different resize settings 128. For example, not only may the image sizes 403 be the same or different from one another, but one resized image 154 corresponding to a first image size may have a compression setting that is different from another resize image corresponding to a second image size. This information is stored in the resize settings 128.

The project(s) 121 includes data relating to image processing such as, for example, the location of the image source, the location of the image destination, the template(s) 118 corresponding to the particular project 121, the user information, and/or other appropriate data for a project 121. The processing data 124 may include data that may be used to process the images according to the parameters defined by the template(s) 118 and resize settings 128.

Network content data 126 may include images, text, code, graphics, audio, video, and/or other content that may be served up by the resizing application 115. To this end, network content data 126 may include static network content or static elements of network content, for example, in hypertext markup language (HTML), extensible markup language (XML), and/or any other language suitable for creating network content. Further network content data 126 may include code that generates dynamic network pages when executed or interpreted in the computing environment 103. Such code may be written in any suitable programming language, such as PHP, Perl, Objective C, Java, Ruby, etc. Network content data 126 may also include code configured to be executed or interpreted within a client 106 in order to render a dynamic network content. Such code may be referred to as applets and may be written in any suitable programming language, such as JavaScript, Java, etc.

The client 106 is representative of a plurality of client devices that may be coupled to the network 109. The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 106 may include a display 146. The display 146 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client 106 may be configured to execute various applications such as a client application 143 and/or other applications. Also, various data is stored in the data store 112b that is accessible the client 106. The data stored in the data store 112b, for example, is associated with the operation of the various applications and/or functional entities described below.

The client application 143 may be executed in a client 106, for example, to access network content served up by the computing environment 103a and/or other servers, thereby rendering a user interface 149 on the display 146. To this end, the client application 143 may comprise, for example, a browser, a dedicated application, etc., and the user interface 149 may comprise a network page, an application screen, etc. The client 106 may be configured to execute applications beyond the client application 143 such as, for example, email applications, social networking applications, word processors, spreadsheets, and/or other applications.

The data stored in the data store 112b may include, for example, the image source 139, the image destination 141, and potentially other data. The image source 139 may include the original images 50 to be processed according to a resizing project 121 created via the resizing application 115. The image source 139 may include individual images or folders including multiple images. The original image(s) 50 included in the image source 139 may be changed depending on a user's needs, may be controlled by a user, may be used in multiple resize projects 121 at a same time, may be monitored for changes and adjustments, and/or may be changed at any time.

The image destination 141 may include the final resized images 154. The image destination 141 may comprise folders for storing the final resized images 154 following processing. The image destination 141 may be controlled by a user, used in multiple resize projects 121 at a same time, monitored for changes and adjustments, and/or changed at any time depending on a user's needs. In various embodiments, the resizing application 115 may upload the original image(s) 50 from the image source 139 via the network 109. After the processing service 136 of the resizing application 115 has processed the original image(s) 50, the resized images 154 may be sent back over the network 109 to the image destination 141 for storage.

Figure 2B:
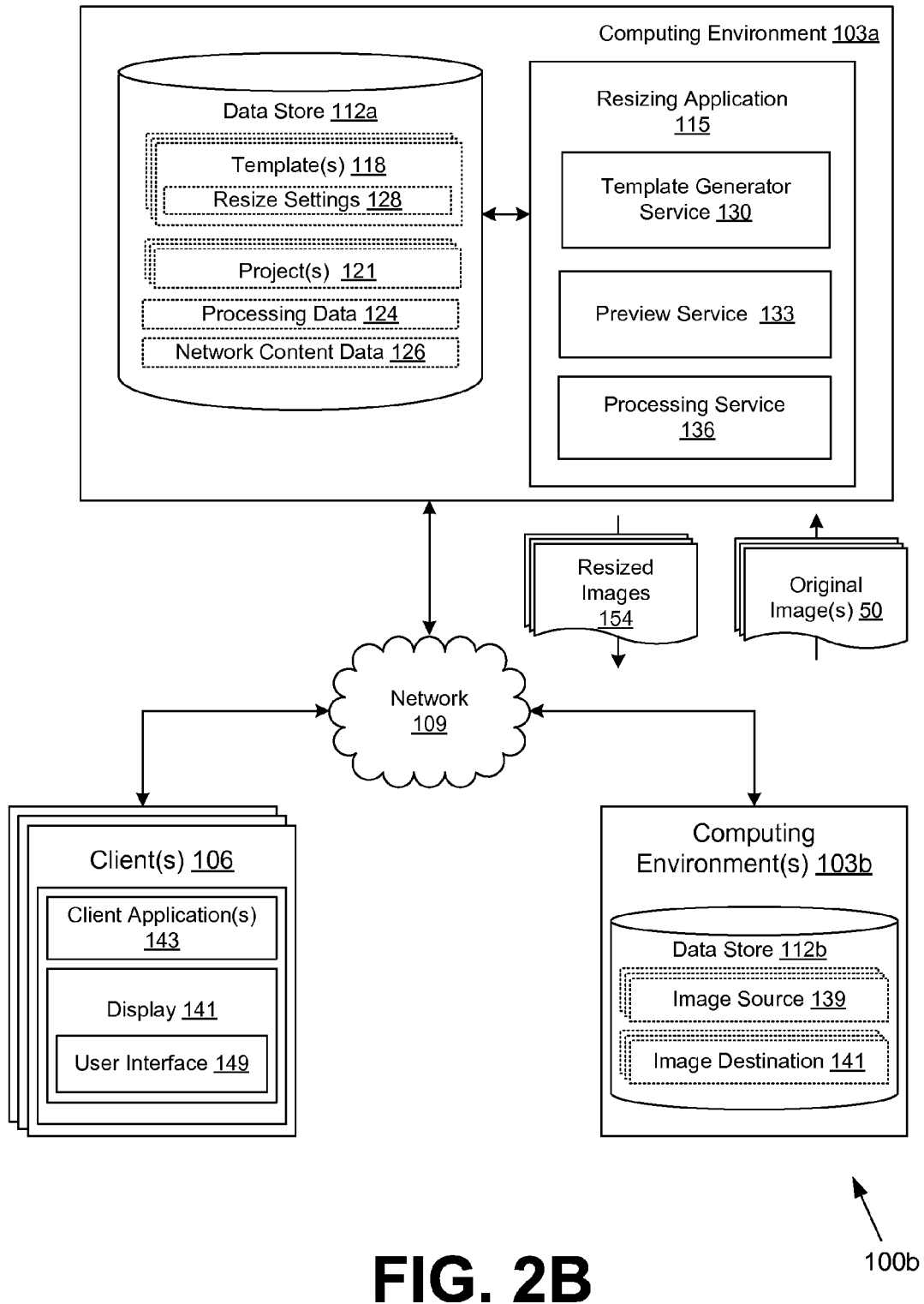

With reference to FIG. 2B, shown is a networked environment 100*b* according to another embodiment relating to image processing. The networked environment 100*b* includes a computing environment 103*a* in data communication with one or more clients 106 and a computing environment 103*b* via a network 109. In contrast to the networked environment 100*a* (FIG. 1A), the data store 112*b* comprising the image source 139 and the image destination 141 may be located within the computing environment 103*b*. Accordingly, the resizing application 115 may access the original image(s) 50 from the image source 139 and store the resized images 154 in the image destination 141 located within the computing environment 103*b*, which is external to both the client 106 and the computing environment 103*a*.

Figure 2C:
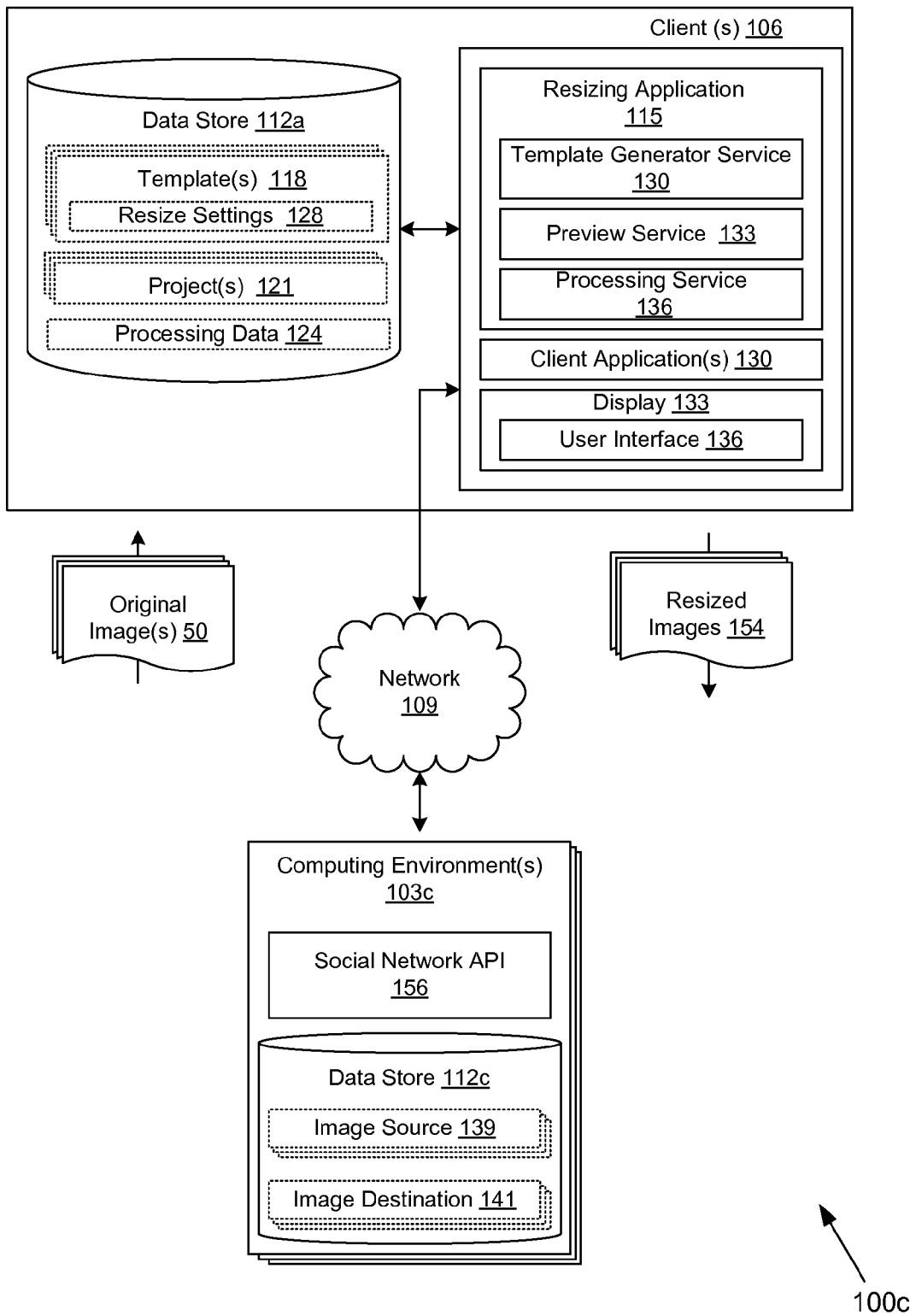

With reference to FIG. 2C, shown is a networked environment 100*c* according to another embodiment relating to image processing. The networked environment 100*c* includes a computing environment 103*a* in data communication with one or more clients 106 via a network 109. In contrast to the networked environment 100*a* (FIG. 2A) and networked environment 100*b* (FIG. 2B), the resizing application 115 is executed by the client 106. In addition, the data stored in the data store 112*a* in the computing environment 103*a* is now stored in the data store 112*b* in the client 106 and is accessible by the client 106.

The components executed on the computing environment 103*c* of FIG. 2C include a social network application programming interface (API) 156, and other applications, services, processes, systems, engines, or functionality not discussed in detail herein. The social network API 156 is configured to provide social networking data to the resizing application 115. The data stored in the data store 112*c* includes, for example, the image source 139, the image destination 141, and/or potentially other data. Accordingly, the resizing application 115 executed on the client 106 may access the original images 50 via the image source 139 in the data store 112*c* on the computing environment 103*c*. The resizing application 115 may store the resized images 154 in the image destination data 141 in the data store 112*c* on the computing environment 103*c*.

It should be noted that FIGS. 2A-2C describe various non-limiting embodiments of the present disclosure. In other embodiments, the resizing application 115 may be accessed by a user via a cloud-based interface, a computing environment 103*a*, 103*b*, 103*c* (hereinafter 103), the client 106, a browser, software plug-ins, an API, third party integration, etc.

In addition to the embodiment discussed in FIG. 2C, the image source 139 may be external to the client and the computing environment 103*a*. For example the image source 139 may be a service such as, for example, Dropbox®, Box, Flicker®, Picasa®, or other similar services. In other embodiments, the image source 139 may be a cloud storage device, a social media service, an API connection, an asset management system, a content management system, a digital marketing automation system, a work in progress system, a social media feed or API, a program such as WordPress®, Drupal®, or Joomla®, a private folder on a network, and/or other appropriate system. The image source 139 may also include an email service, camera integration, and/or other sources for direct upload.

In other embodiments of the present disclosure, the image destination 141 may be created and added to any connected network 109 or structure, such as, for example, the sources discussed above with respect to the image source 139. In addition, the image destination 141 may be located in a completely different location than the image source 139. For example, the image source 139 may be provided via a social media service and the image destination 141 may be located on a client 106.

Next, a general description of the operation of the various components of the networked environments 100*a*, 100*b*, 100*c* is provided. To begin, a user may access the resizing application 115 to begin a project 121 for processing and resizing one or more original images 50. In some embodiments, the resizing application 115 may be accessible via the computing environment 103*a* (FIGS. 2A-2B) or via the client 106 (FIG. 2C). To create a project 121, the image source 139 and image destination 141 are determined. A user may input a location for the image source 139 and location for the image destination 141 via a user interface 149 rendered on the client 106. In some embodiments, the image source 139 comprises a single original image 50 for processing. In other embodiments, the image source 139 comprises multiple original images 50 for processing.

Upon selecting an image source 139 and image destination 141 for the project 121, the user may create or select a template 118 to be used for processing. In some embodiments, the template 118 comprises a set of predefined resize settings 128 for an image processing project 121. For example, the number and sizes of image sizes 403 (FIG. 4) may be predefined. In addition, the corresponding resize settings 128 for each image size 403 may be predefined. In other embodiments, a user may create a template 118 and specify the resize settings 128 for a specific template 118 and project 121. The user may input resize settings 128 and/or may choose from a predefined set of options. In other embodiments, a user may modify a pre-existing template 118 to conform to specific resize settings 128 selected by the user. For example, a user may select a predefined template 118 and may add a new image size 403 to the template 118 and/or may delete an existing image size 403 to the template 118.

Upon creating, modifying, and/or selecting template 118, a user may then save the template 118. Upon obtaining a request to save the template 118, the resizing application 115 may save the template 118 accordingly and then generate a preview 500 (FIG. 5) of the original image(s) 50 obtained from the image source 139 according to the template 118 and resize settings 128. The preview 500 may comprise preview images 502 (FIG. 5) of the original image(s) 50 according to the template 118 and resize settings 128. The user may further make adjustments to each individual preview image 502 prior to a final processing. For example, the user may adjust the scale, adjust the crop, adjust the image color, apply filters, adjust the resize setting, update the original image, and/or make other adjustments to the preview 500 of preview images 502. When previewing the preview images 502, the user may also view the preview images 502 for other original images 50, view images that have been adjusted, add or adjust image tags, share the preview access with other, add comments to one or more preview images 502, and/or view previous versions of the images. Once the user has been able to preview the preview images 502 and make desired adjustments, the user may then request that the resizing application 115 process the original image(s) 50 in accordance to the template 118 and modified resize settings 128 to generate the final resized images 154. The processing service 136 of the resizing application 115 may process the original images 50 to generate the final resized images 154 and store the final resized images 154 in the image destination 141.

In some embodiments, the image destination 141 may be monitored by the resizing application 115 to determine whether other resizes of the original image(s) 50 previously exist. Accordingly, the processing service 136 may only generate final resized images 154 that are new or have been modified from the pre-existing images in the image destination 141. In some embodiments, the image destination 141 is not monitored and the processing service 136 may generate all of the final resized images 154 according to the template 118 and resize settings 128 for the project 121.

Figure 3:
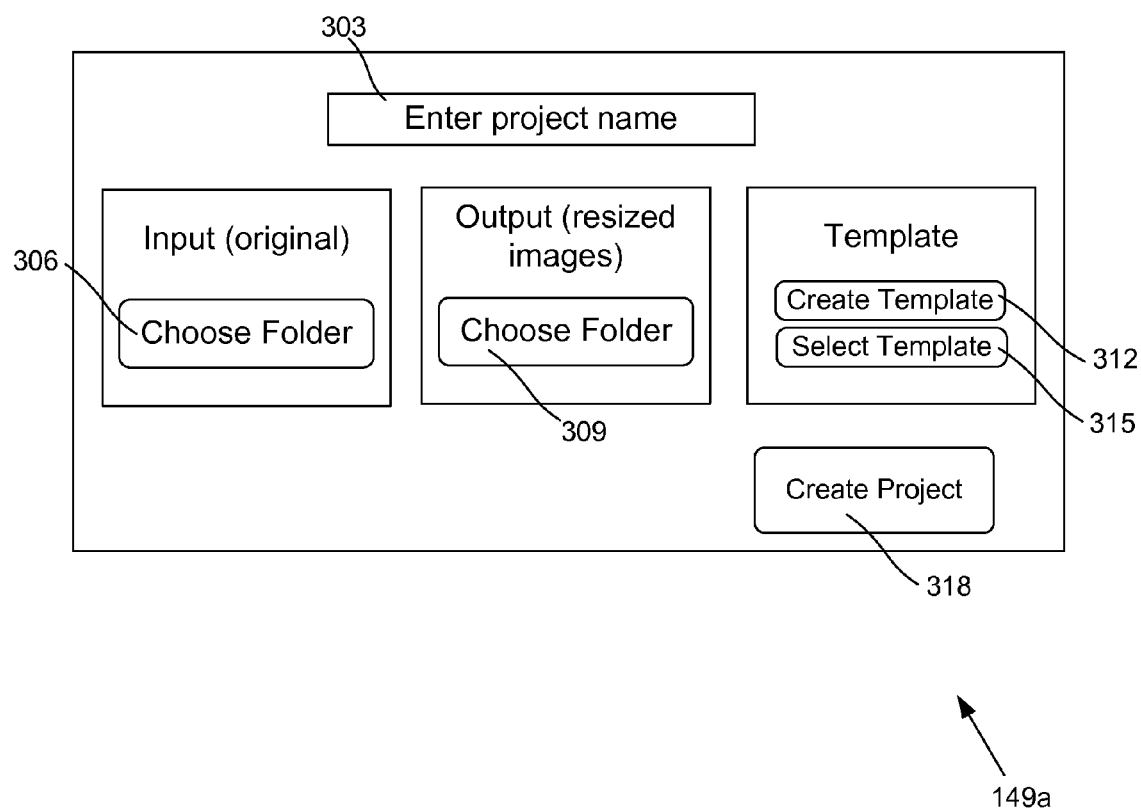
FIGS. 3-5 are pictorial diagrams of example user interfaces rendered by a client in the networked environments of FIG. 2A-2C according to various embodiments of the present disclosure.

Referring next to FIG. 3, shown is an example of a user interface 149a rendered by a client 106 in the networked environment 100a, 100b, 100c (FIGS. 2A-2C) according to various embodiments of the present disclosure. In particular, FIG. 3 depicts an example of a create project view rendered by a client application 143 executing on the client.

The create project view may include a name entry component 303, an input source component 306, an image destination component 309, a create template component 312, a select template component 315, a create project component 318, and/or other appropriate components. The name entry component 303 illustrates a component that a user may enter a name of a project 121. Although the name entry component 303 is depicted as a text input field, the name entry component 303 may comprise a text area, a drop-down box and/or other types of components. The input source component 306 may be selected to select the image source 139 for the original image(s) 50 for the project 121. Upon selection of the input source component 306, the user may be presented with a file listing including a list of potential image sources 139. The image destination component 309 may be chosen to select the image destination 141 for the final resized images 154 for the project 121. Upon selection of the image destination component 309, the user may be presented with a file listing including a list of potential image destinations 141. The create template component 312 may be chosen when a user wants to create a new template 118 for a project 121. Upon selection, the user may be presented with a list of resize settings 128 to define for creating a new template 118. The select template component 315 may be chosen to select from one or more predefined templates 118. The create project component 318 may be selected to create a project 121 according to selected image source 139, selected image destination 141, selected template 118, and/or other project parameters.

Figure 4:
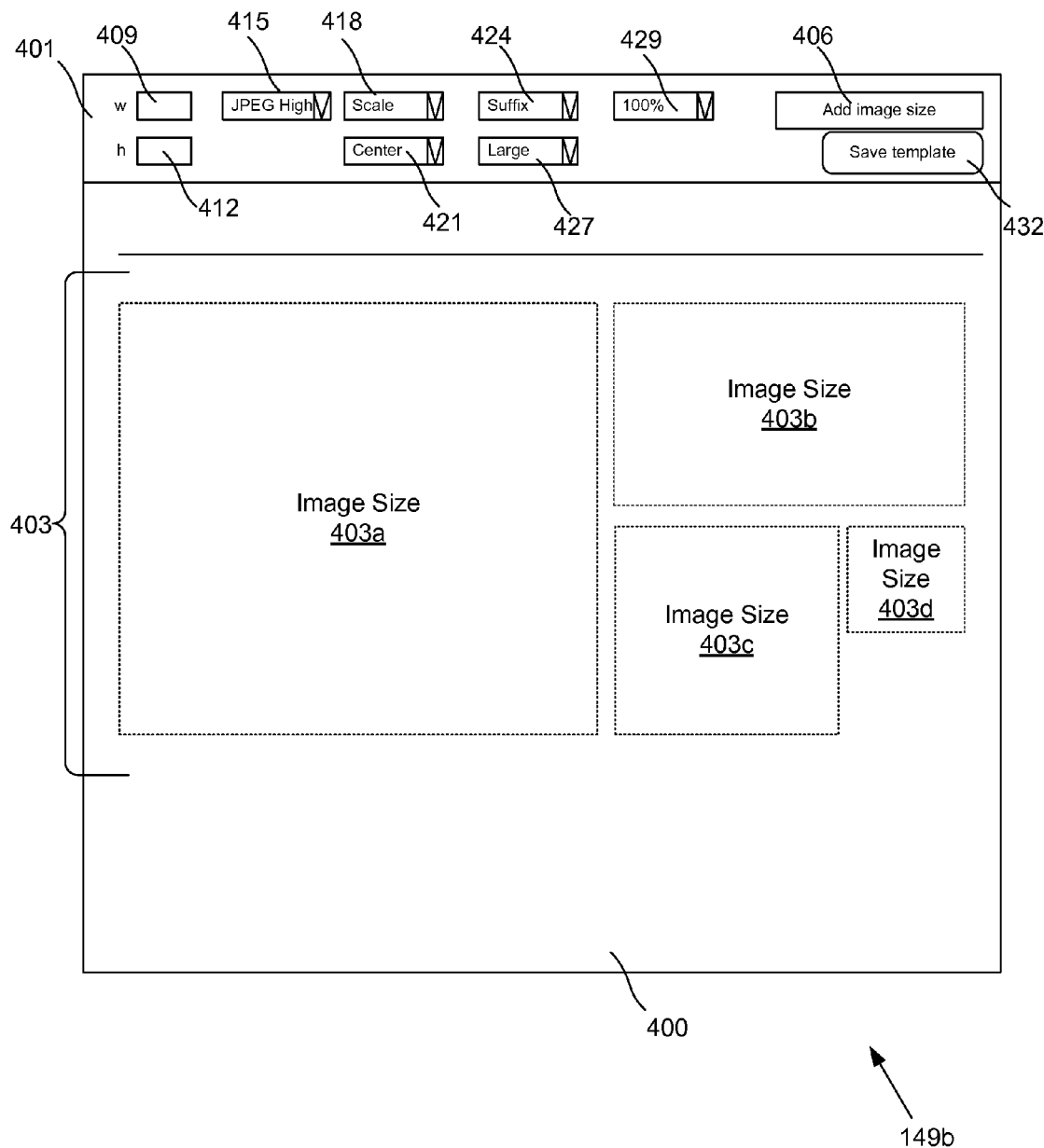

Turning now to FIG. 4, shown is drawing of an example of a user interface 149b rendered by a client 106 in the networked environment 100a, 100b, 100c (FIGS. 2A-2C) according to various embodiments of the present disclosure. In particular, FIG. 4 depicts an example of a template view 400 and toolbar 401 rendered by a client application 143 executing on the client.

Specifically, the template view 400 may comprise multiple image sizes 403 according to a template 118. The multiple image sizes 403 may comprise image size 403a, image size 403b, image size 403c, and image size 403d. In some embodiments, the template 118 may have more or less image sizes. The toolbar 401 may comprise resizing setting components, an add image size component 406, and a save template button 432. The resizing setting components may include a width component 409, a height component 412, a compression setting component 415, a scaling component 418, a positioning component 421, a file type component 424, a file size component 427, a preview size component 429, and/or other resizing setting components. In some embodiments, the toolbar 401 may comprise more or less components associated with the resize settings 128. The resize settings components may be used to define specific settings for a resizing project 121. In some embodiments, the resizing setting components may be pre-populated with resize settings 128 corresponding to a selected template 118. In other embodiments, a user may define the resize settings 128. In other embodiments, the user may select the resize settings 128 from a set of pre-set options.

In one non-limiting example, the width component 409 and the height component 412 correspond to width and height settings for a respective image size 403. For example, the width setting for image size 403a may be "16" and the height setting for image size 403a may be "9." The width and height settings for image size 403b may be different than those for image size 403. Although the width component 409 and the height component 412 of FIG. 4 comprise text input boxes, the width component 409 and height component 412 may comprise a drop-down box and/or other appropriate type of component.

In another non-limiting example, the compression setting component 415 may be selected by a user to define a compression setting for each image. For example, the compression setting listed in FIG. 4 corresponds to JPEG high. However, the compression setting component 415 may comprise a drop-down box that includes other types of compression settings that may be selected for a given project 121. Although the compression setting component 415 is depicted as a drop-down box, some embodiments may comprise one or more check boxes, radio buttons, or other type of component for selecting a type of compression setting.

With respect to other resize setting components, the scaling component 418 corresponds to a scaling setting for each resized image 154 in a project 121. The positioning component 421 may correspond to the positioning of an image for a specific image size 403. For example, an image corresponding to a first image size 403a may be positioned in the center for image size 403a and may positioned to the left for image size 403b. The file type component 424 may be selected by a user to select a type of file for the image sizes 403. The file size component 427 may be selected by a user to select a file size for the image sizes 403. The preview size component 429 may be selected by a user to select the preview size of an image. For example, the preview size component 429 may be selected to request that the images in the preview 500 (FIG. 5) are zoomed out to 50%.

The add image size component 406 may be selected to add a new image size 403 to the template 118 corresponding to the template view 400. Upon selection of the add image size component 406, a user may define parameters for a new image size 403. In some embodiments, the user may remove an image size 403 from the template 118 corresponding to the template view 400. For example, a user may select image size 403d and request that the image size 403d be deleted. The save template button 432 may be selected to save the appropriate template 118 according to the defined resize settings 128. The save template button 432 may be selected to save the template 118 as a new template 118 and/or save modifications to the current template 118. In addition, upon selection for the save template button 432, the resizing application 115 may then generate a preview 500 of original image 50 as preview images 502 according to the saved template 118 and corresponding resize settings 128.

Figure 5:
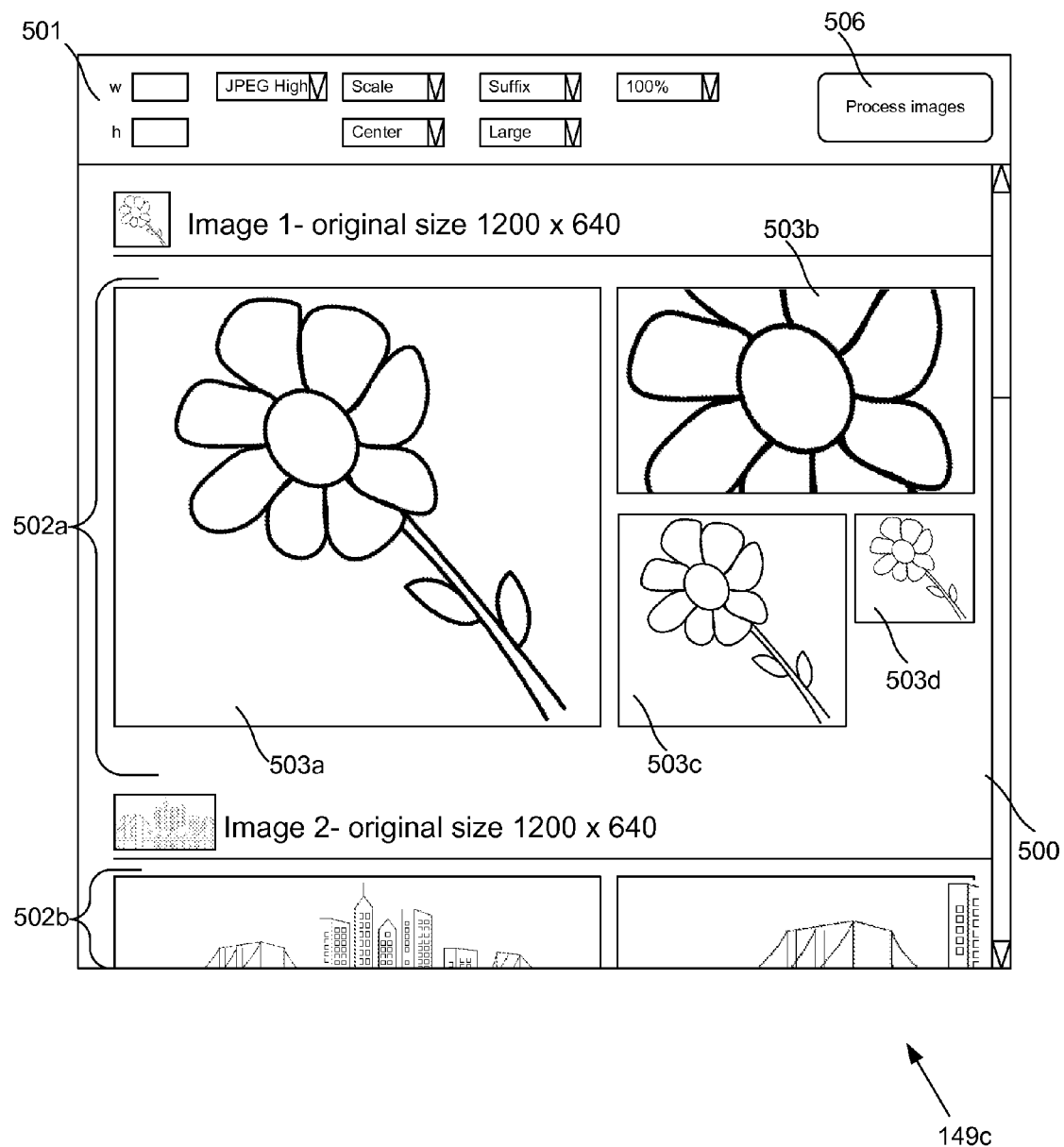

Moving on to FIG. 5, shown is a drawing of an example of a user interface 149c rendered by a client 106 in the networked environment 100a, 100b, 100c (FIGS. 2A-2C) according to various embodiments of the present disclosure. In particular, FIG. 5 depicts an example of a preview 500 and a toolbar 501 rendered by a client application 143 executing on the client.

The preview 500 may comprise one or more sets of preview images 502a, 502b (hereinafter 502) corresponding to the original images 50 obtained from the image source 139. The preview images 502 may correspond to image sizes 403 (FIG. 4) as defined by the template 118 and resize settings 128. For example, the preview image 503a corresponds to the image size 403a of the template 118 defined in FIG. 4. Accordingly, the preview image 503b corresponds to the image size 403b, the preview image 503c corresponds to the image size 403c, and the preview image 503d corresponds to the image size 403d. In addition, the preview 500 of FIG. 5 illustrates preview image 502a corresponding to a first original image 50 and preview image 502b corresponding to a second original image 50.

The toolbar 501 may comprise resizing setting components such as the resizing setting components of FIG. 4, a process image component 506, and/or other components. In some embodiments, a user may further define and adjust the resize settings 128 for one or more of the preview images 502. For example, the user may select preview image 503c and request that the preview image 503c be deleted. As such, the resized settings 128 may be modified to delete the corresponding image size 403c (FIG. 4). The user may also select the preview image 503a and change the settings defining the image size 403 (FIG. 4) via the user interface 149c. In one embodiment, the user may select the actual image and dynamically adjust the image size 403. In other embodiments, the user may select a preview image 503a and change one or more of the resize settings 128 via the corresponding resize settings components.

The process image component 506 may be selected by the user to request that the original image(s) 50 be processed according to the template 118 and modified resize settings 128.

Figure 6:
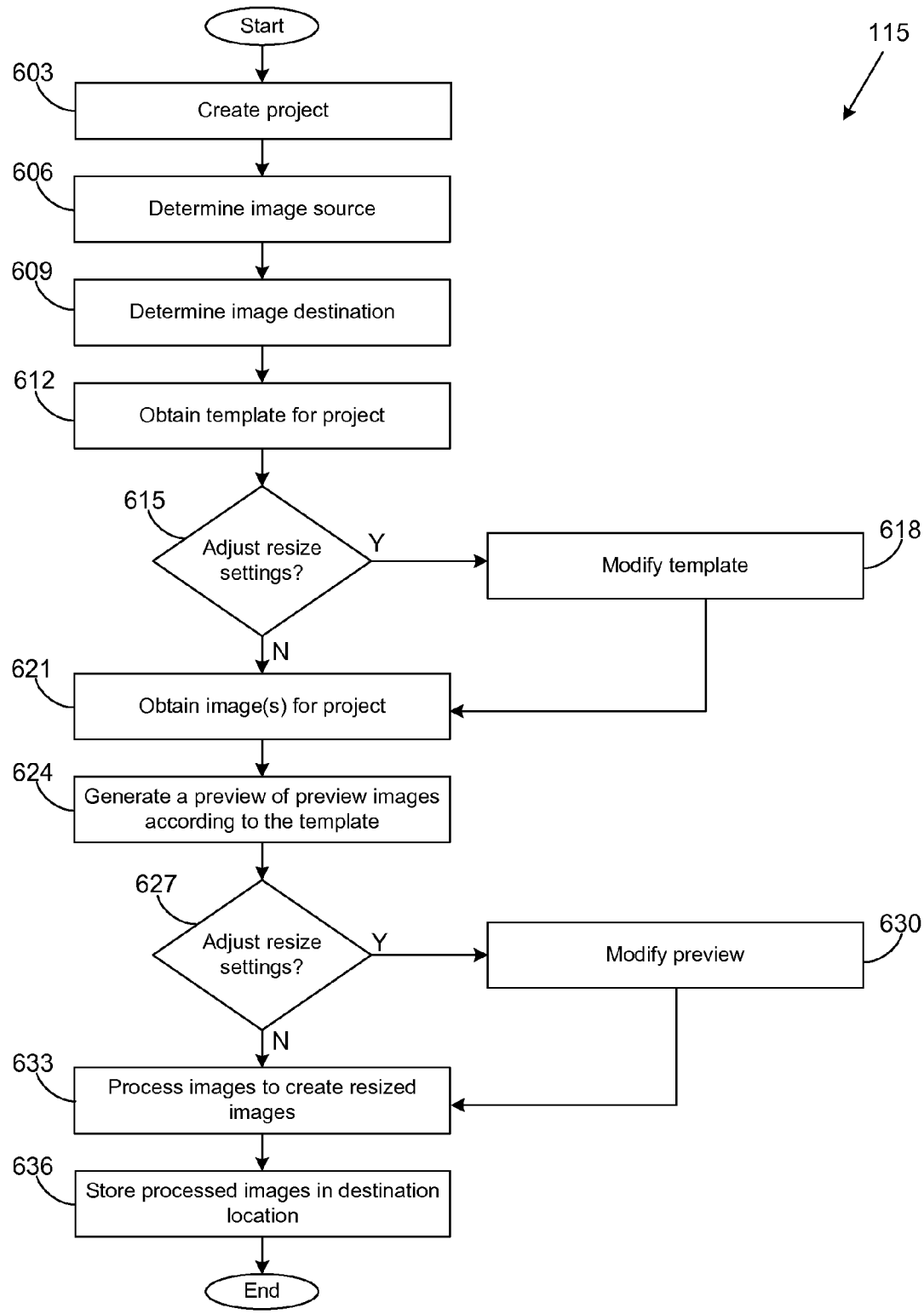
FIG. 6 is a flowchart illustrating one example of functionality implemented as portions of resizing application executed in a computing environment or client in the networked environments of FIGS. 2A-2C according to various embodiments of the present disclosure.

Referring next to FIG. 6, shown is a flowchart that provides one example of the operation of a portion of the resizing application 115 (FIGS. 2A-2C) according to various embodiments. It is understood that the flowchart of FIG. 6 provides merely an example of the many different types of functional arrangements that may be employed to implement the operation of the portion of the resizing application 115 as described herein. As an alternative, the flowchart of FIG. 6 may be viewed as depicting an example of elements of a method implemented in the computing environment 103a (FIG. 2A-2B) and/or client 106 (FIG. 2C) according to one or more embodiments.

Beginning with reference numeral 603, the resizing application 115 creates a project 121 (FIGS. 2A-2C). In some embodiments, the resizing application 115 creates a project 121 in response to a request obtained via a user interface 149 (FIGS. 2A-2C) rendered on a client 106. The project 121 is created for an image processing project relating to processing an original image(s) 50 to generate multiple final resized images 154 (FIGS. 2A-2C) for various image size requirements and/or devices. At reference numeral 606, the resizing application 115 determines the image source 139 (FIGS. 2A-2C) for the original image(s) 50 (FIG. 1) for the project 121. In some embodiments, the user may select an image source 139, define an image source 139, and/or notify the resizing application 115 of the image source 139. As previously discussed, the image source 139 may be a folder and/or subfolder of one or more original image(s) 50, a single image, email service, a multimedia messaging service (MMS), Dropbox®, Box, Flickr®, Picasa®, or other similar services, a cloud storage device, a social media service, an API connection, files/folders within a cloud program, files/folders within or provided by an asset management system, files/folders within or provided by a content management system, files/folders within or provided by a digital marketing automation system, files/folders within or provided by a work in progress system, files/folders within or proved by a social media feed or API, a folder in a program such as, for example, Wordpress®, Drupal®, or Joomla®, a private folder on a network, a camera, etc.

At reference numeral 609, the resizing application 115 determines the image destination 141 (FIGS. 2A-2C) for the final resized images 154 (FIGS. 2A-2C). The image destination 141 may be any one of the locations of the image source 139 as defined above. In some embodiments, the image destination 141 may be different from the image source 139. For example, the image source 139 may be a social media service such as, for example, Facebook®. However, the image destination 141 may be a folder local to the client 106. As previously discussed, the image destination 141 may be created and added to any connected network 109 or structure including, but not limited to the image sources 139 discussed above.

At reference numeral 612, the resizing application 115 via the template generator service 130 (FIGS. 2A-2C) obtains a template 118 (FIGS. 2A-2C) for the project 121. In some embodiments, the template 118 is a predefined template 118 is selected based at least in part on the image source 139, the image destination 141, the templates 118 accessible via the resizing application 115, and/or other factors. In some embodiments, a user may request via a user interface 149 rendered on a client 106 to create a new template 118.

At reference numeral 615, the resizing application 115 via the template generator service 130 determines if any resize settings 128 are to be adjusted. In some embodiments, a user may request the resize settings 128 be adjusted, create new sizes and resize settings 128, remove image sizes from a template 118, etc. The user may also, request that the resize settings 128 corresponding to each resize image 502 (FIG. 5) be adjusted. For example, the user may adjust the file type (including but not limited to .jpg, .gif, .png, .psd, .eps, tif, .pdf), file compression, file names, high resolution settings, print specific settings, unsharp masking, filters, image groupings, preview style, preview size, cropping preferences, scaling preference, padding preferences, image margins, 3D groupings, automatic crops and scales based at least in part on image attributes, etc. In reference numeral 618, the resizing application 115 via the template generator service 130 modifies the template 118 and resize settings 128 accordingly.

At reference numeral 621, the resizing application 115 obtains the original image(s) 50 for the project 121. At reference numeral 624, the resizing application 115 via the preview service 133 (FIGS. 2A-2C) generates a user interface 149 comprising a preview 500 (FIG. 5) of preview images 502 (FIG. 5) of the original image(s) 50 according to the modified template 118 and modified resize settings 128. The preview 500 may comprise preview images 502 of multiple original images 50 via a single user interface 149. The preview may further comprise images that have been changed since the last time that the resizes were generated, images that have been adjusted, images that have not been adjusted, images that do not fit within quality standards, etc. The preview 500 may be rendered on the client 106. In embodiments where the resizing application 115 is local to the client 106, the user interface 149 comprising the preview is rendered on the client 106. In embodiments where the resizing application 115 is not local to the client, the resizing application 115 sends the user interface 149 comprising the preview over the network 109 to the client 106 for rendering.

At reference numeral 627, the resizing application 115 via the preview service 133 determines whether to adjust any of the resize settings 128 corresponding to the preview images 502. The user may be provided a preview 500 of the preview images 502 in one user interface 149, and may make adjustments to each of the preview images 502 accordingly. For example, the user may adjust the scale, adjust the crop, adjust the margins and padding, adjust the image color, apply filters, replace the original image 50 with a retouched image, etc., via controls on the user interface 149 comprising the preview 500. In some embodiments, the user may request that one or more of the preview images 502 include tags and/or comments.

At reference numeral 630, the preview service 133 modifies the resize settings 128 for the project 121 specific to the adjustment requests by the user on the client 106. At reference numeral 633, the resizing application 115 via the processing service 136 processes the original image(s) 50 according to the resize settings 128 and template 118 as approved via the preview 500 to generate the final resized images 154. In some embodiments, the image destination 141 may be monitored by the resizing application 115 to determine whether other resizes of the original image(s) 50 previously exist. Accordingly, the processing service 136 may only generate final resized images 154 that are new or have been modified. In some embodiments, the image destination 141 is not monitored, and the processing service 136 may generate all of the final resized images 154 according to the template 118 and resize settings 128 for the project 121. At reference numeral 636, the resizing application 115 via the processing service 136 stores the final resized images 154 in the image destination 141.

Figure 7:
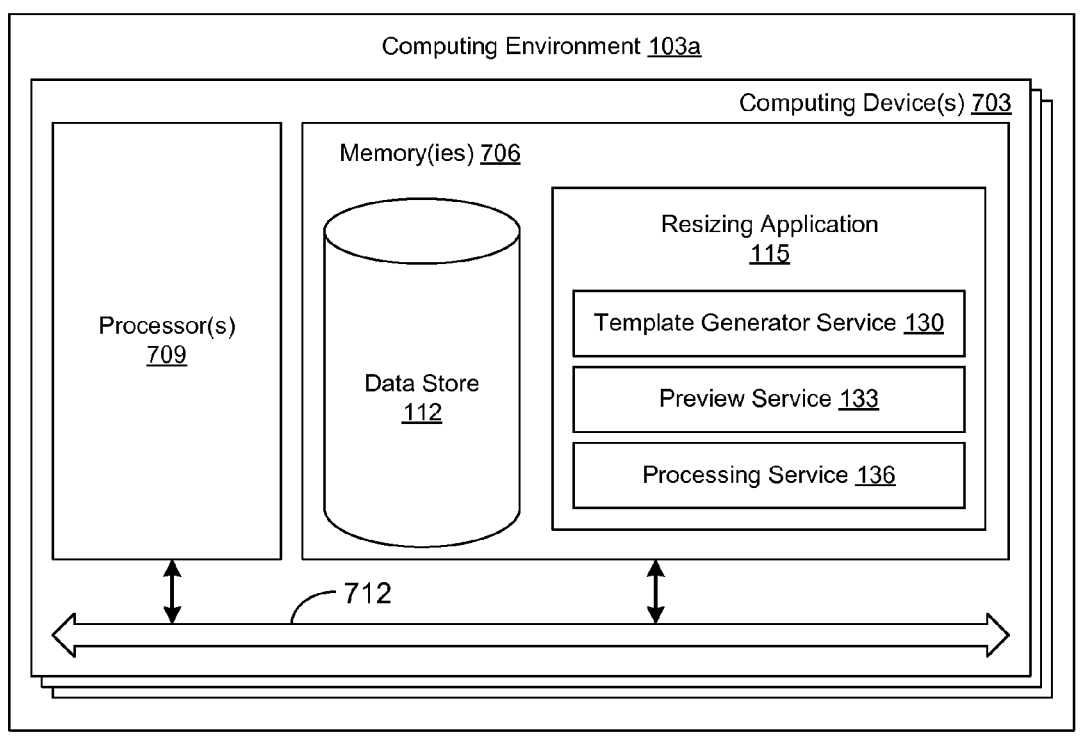
FIG. 7 is a schematic block diagram that provides one example illustration of a computing environment employed in the networked environment of FIGS. 2A-2B according to various embodiments of the present disclosure.

With reference to FIG. 7, shown is a schematic block diagram of the computing environment 103 according to an embodiment of the present disclosure. The computing environment 103 includes one or more computing devices 703. Each computing device 703 includes at least one processor circuit, for example, having a processor 709 and a memory 706, both of which are coupled to a local interface 712. To this end, each computing device 703 may comprise, for example, at least one server computer or like device. The local interface 712 may comprise, for example, a data bus with an accompanying address/control bus or other bus structure as can be appreciated.

Stored in the memory 706 are both data and several components that are executable by the processor 709. In particular, stored in the memory 706 and executable by the processor 709 are the resizing application 115, template generator service 130, preview service 133, processing service 136, and potentially other applications. Also stored in the memory 706 may be a data store 112 and other data. In addition, an operating system may be stored in the memory 706 and executable by the processor 709.

It is understood that there may be other applications that are stored in the memory 706 and are executable by the processor 709 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 706 and are executable by the processor 709. In this respect, the term "executable" means a program file that is in a form that can ultimately be run by the processor 709. Examples of executable programs may be, for example, a compiled program that can be translated into machine code in a format that can be loaded into a random access portion of the memory 706 and run by the processor 709, source code that may be expressed in proper format such as object code that is capable of being loaded into a random access portion of the memory 706 and executed by the processor 709, or source code that may be interpreted by another executable program to generate instructions in a random access portion of the memory 706 to be executed by the processor 709, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 709 may represent multiple processors 709 and/or multiple processor cores and the memory 706 may represent multiple memories 706 that operate in parallel processing circuits, respectively. In such a case, the local interface 712 may be an appropriate network that facilitates communication between any two of the multiple processors 709, between any processor 709 and any of the memories 706, or between any two of the memories 706, etc. The local interface 712 may comprise additional systems designed to coordinate this communication, including, for example, performing load balancing. The processor 709 may be of electrical or of some other available construction.

Although resizing application 115, template generator service 130, preview service 133, processing service 136, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 6 shows the functionality and operation of an implementation of portions of the resizing application 115. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 709 in a computer system or other system. The machine code may be converted from the source code, etc. If embodied in hardware, each block may represent a circuit or a number of interconnected circuits to implement the specified logical function(s).

Although the flowchart of FIG. 6 shows a specific order of execution, it is understood that the order of execution may differ from that which is depicted. For example, the order of execution of two or more blocks may be scrambled relative to the order shown. Also, two or more blocks shown in succession in FIG. 6 may be executed concurrently or with partial concurrence. Further, in some embodiments, one or more of the blocks shown in FIG. 6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the resizing application 115, the template generator service 130, the preview service 133, and the processing service 136, that comprises software or code can be embodied in any non-transitory computer-readable medium for use by or in connection with an instruction execution system such as, for example, a processor 709 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the resizing application 115, the template generator service 130, the preview service 133, and the processing service 136, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 703, or in multiple computing devices in the same computing environment 103. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A system, comprising:
at least one computing device having a processor and a memory; and
a resizing application executed in the at least one computing device, the resizing application causing the at least one computing device to perform a method comprising:
generating a resizing template based at least in part on one or more user-selected specifications, the resizing template indicating a plurality of image sizes, individual image sizes being a different image size from one another, the individual image sizes indicating a respective size to size an image, and the image being retrieved from an image source;
generating a preview of a plurality of preview images according to the resizing template and the image, individual preview images of the plurality of preview images comprising the image being displayed according to a respective image size of the plurality of images sizes such that a first preview image includes the image sized according to a first image size and a second preview image include the image sized according to a second image size;
modifying a resize setting for at least one of the plurality of preview images in the preview; and
processing the image to create a plurality of final resized images of the image according to the preview, the plurality of image sizes, the modified resize setting, and a confirmation to process the image according to the preview and the modified resize setting; and
storing the plurality of final resized images in an image destination folder.

2. The system of claim 1, wherein the image comprises a plurality of images, and the preview includes a first plurality of preview images for a first image according to the template and a second plurality of preview images for a second image according to the template.

3. The system of claim 1, wherein the resize setting is at least one of the following: an image size setting, an image resolution setting, a cropping setting, a compression setting, a file type, or a file name.

4. The system of claim 1, wherein modifying the resize setting further comprises adjusting a size of the at least one of the plurality of preview images.

5. The system of claim 1, wherein the resizing application causes the at least one computing device to perform the method further comprising adding a new image size to the resizing template.

6. The system of claim 1, wherein the resizing application causes the at least one computing device to perform the method further comprising removing an image size of the plurality of image sizes from the resizing template.

7. A method, comprising:
generating, by at least one computing device, a resizing template based at least in part on a plurality of resize settings, the resizing template indicating a plurality of image sizes, individual image sizes being different from other image sizes of the plurality of image sizes, and the individual image sizes indicating a respective size to size an image retrieved from an image source;
generating, by the at least one computing device, a preview comprising a plurality of preview images of an image according to the resizing template, the preview displaying the image according to the individual image sizes such that the preview includes a first representation of the image at a first size and a second representation of the image at a second size;
modifying, by the at least one computing device, at least one of the plurality of resize settings that corresponds to a preview image of the plurality of preview images in the preview; and
processing, by the at least one computing device, the image to generate a plurality of final resized images according to the template and the plurality of resize settings, individual final resized images of the plurality of final resized images corresponding to a respective representation of the image according to a respective image size defined by the template; and
storing, the plurality of final resized images to a destination folder.

8. The method of claim 7, wherein the image comprises a plurality of images, and the preview comprises a first plurality of preview images for a first image according to the template and a second plurality of preview images for a second image according to the template.

9. The method of claim 7, wherein the resize settings are user-defined.

10. The method of claim 7, wherein at least one of the plurality of resize settings comprise at least one of the following: image size data, a resolution setting, an image cropping setting, a compression setting, a file type, or file name.

11. The method of claim 7, wherein modifying at least one of the plurality of resize settings further comprises adjusting a size of the preview image.

12. The method of claim 7, further comprising adding, by the at least one computing device, a new image size to the resizing template.

13. The method of claim 7, further comprising removing, by the at least one computing device, an image size of the plurality of image sizes from the resizing template.

14. A non-transitory computer-readable medium embodying a program executable in at least one computing device, wherein, when executed, the program causes the at least one computing device to perform a method comprising:
obtaining a template for resizing a plurality of images obtained from an image source, the template defining a plurality of image sizes, individual image sizes representing a respective different size to size individual images of the plurality of images;
generating a preview displaying the plurality of images sized according to the individual image sizes as defined by the template, the preview displaying a corresponding plurality of preview images for individual images of the plurality of images such that a first plurality of preview images display a first image according to the template and the plurality of image sizes and a second plurality of preview images display a second image according to the template and the plurality of image sizes;
providing the preview for rendering on a client device, the preview being provided over a network to the client device;
modifying a resize setting for at least one of the corresponding plurality of preview images in response to receiving a request to modify the resize setting; and
processing the plurality of images to generate a plurality of final resized images according to the preview displaying the plurality of images and modified resize setting; and
storing the plurality of final resized images into a destination folder.

15. The non-transitory computer-readable medium of claim 14, wherein the resize setting is at least one of the following: a size for the preview image, a file type for the preview image, a resolution for the resized image, a cropping preference for the resized image, an edit for the resized image, a compression setting for the resized image, or a scaling preference for the resized image.

16. The non-transitory computer-readable medium of claim 14, wherein the program causes the at least one computing device to perform the method further comprising adding a new image size to the template.

17. The non-transitory computer-readable medium of claim 14, wherein the program causes the at least one computing device to perform the method further comprising modifying the template by adjusting a size of at least one of the plurality of image sizes.

18. The non-transitory computer-readable medium of claim 14, wherein the program further causes the at least one computing device to perform the method further comprising removing an image size of the plurality of image sizes from the template.

19. The non-transitory computer-readable medium of claim 14, wherein the template is defined according to user-defined settings.

* * * * *